United States Patent
Kinoshita et al.

(10) Patent No.: US 9,518,832 B2
(45) Date of Patent: Dec. 13, 2016

(54) DRIVE-PATTERN EVALUATION DEVICE AND DRIVE-PATTERN EVALUATION METHOD

(75) Inventors: Ryusuke Kinoshita, Tokyo (JP); Takashi Irie, Tokyo (JP); Masahiko Ikawa, Tokyo (JP); Yuko Ohta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/406,360

(22) PCT Filed: Jun. 27, 2012

(86) PCT No.: PCT/JP2012/066344
§ 371 (c)(1),
(2), (4) Date: Dec. 8, 2014

(87) PCT Pub. No.: WO2014/002208
PCT Pub. Date: Jan. 3, 2014

(65) Prior Publication Data
US 2015/0149069 A1    May 28, 2015

(51) Int. Cl.
*G01C 21/34* (2006.01)
*G01C 21/26* (2006.01)
(Continued)

(52) U.S. Cl.
CPC ....... *G01C 21/3469* (2013.01); *B60R 16/0236* (2013.01); *B60W 40/09* (2013.01);
(Continued)

(58) Field of Classification Search
CPC ... B60R 16/0236; B60W 30/10; B60W 40/09; B60W 2530/14; F02D 29/02; F02D 2200/606; F02D 2200/0616; F02D 2200/0625; G01C 21/26; G01C 21/3469; G01F 9/00; G01F 9/008; G01F 9/02; G01F 9/023
See application file for complete search history.

(56) References Cited

U.S. PATENT DOCUMENTS

| 4,956,632 A * | 9/1990 | Perrigo | ............... B60Q 1/52 340/463 |
| 7,772,970 B2 * | 8/2010 | Masuda | ............... F02D 11/105 340/438 |

(Continued)

FOREIGN PATENT DOCUMENTS

| CN | 102473347 A | 5/2012 |
| JP | 2001-108503 A | 4/2001 |

(Continued)

OTHER PUBLICATIONS

International Search Report issued in PCT/JP2012/066344, mailed on Oct. 2, 2012.

*Primary Examiner* — Jerrah Edwards
*Assistant Examiner* — Tamara Weber
(74) *Attorney, Agent, or Firm* — Birch, Stewart, Kolasch & Birch, LLP

(57) ABSTRACT

An object of the present invention is to provide a drive-pattern evaluation device for appropriately evaluating energy-saving performance of a drive pattern. A drive-pattern evaluation device of the present invention is a drive-pattern evaluation device which evaluates a past actual drive pattern of a moving body based on energy consumption, the device including: an energy-saving drive pattern generating unit that generates an energy-saving drive pattern in consideration of energy consumption with respect to an evaluation section of the actual drive pattern; an energy consumption estimating unit that estimates energy consumption by the energy-saving drive pattern as an estimated energy-saving consumption; and an eco-score calculator that compares energy consumption by the actual drive pattern in
(Continued)

the evaluation section and the estimated energy-saving consumption, to evaluate the actual drive pattern based on the comparison result.

20 Claims, 6 Drawing Sheets

(51) Int. Cl.
    *G01F 9/00*     (2006.01)
    *B60R 16/023*     (2006.01)
    *G01F 9/02*     (2006.01)
    *B60W 40/09*     (2012.01)
    *F02D 29/02*     (2006.01)

(52) U.S. Cl.
    CPC ............ *F02D 29/02* (2013.01); *G01C 21/26* (2013.01); *G01F 9/00* (2013.01); *G01F 9/008* (2013.01); *G01F 9/02* (2013.01); *G01F 9/023* (2013.01); *B60W 2530/14* (2013.01); *F02D 2200/0616* (2013.01); *F02D 2200/0625* (2013.01); *F02D 2200/606* (2013.01)

(56) References Cited

U.S. PATENT DOCUMENTS

| | | | |
|---|---|---|---|
| 8,112,203 B2* | 2/2012 | Shin | B60W 50/0098 477/37 |
| 8,224,561 B2* | 7/2012 | Kim | G07C 5/004 701/123 |
| 8,239,127 B2 | 8/2012 | Kono et al. | |
| 8,305,205 B2* | 11/2012 | Kaneda | B60K 35/00 340/438 |
| 8,335,639 B2* | 12/2012 | Bruns | B60W 30/18018 340/439 |
| 8,694,232 B2 | 4/2014 | Kono et al. | |
| 9,183,740 B2 | 11/2015 | Ota et al. | |
| 2009/0259354 A1* | 10/2009 | Krupadanam | B60W 10/06 701/22 |
| 2010/0114473 A1* | 5/2010 | Kono | G01C 21/3469 701/532 |
| 2010/0274426 A1* | 10/2010 | Le Brusq | B60K 6/48 701/22 |
| 2010/0299056 A1* | 11/2010 | Mueller | G01C 21/3469 701/532 |
| 2010/0324795 A1* | 12/2010 | Tsumori | B60K 6/445 701/70 |
| 2011/0060495 A1 | 3/2011 | Kono et al. | |
| 2011/0060517 A1 | 3/2011 | Kono et al. | |
| 2012/0109510 A1 | 5/2012 | Ota et al. | |

FOREIGN PATENT DOCUMENTS

| | | |
|---|---|---|
| JP | 2006-284443 A | 10/2006 |
| JP | 2010-203405 A | 9/2010 |
| JP | 2011-53162 A | 3/2011 |
| JP | 2011-59921 A | 3/2011 |
| JP | 2012-6485 A | 1/2012 |
| WO | WO 2011/036855 A1 | 3/2011 |
| WO | WO 2012/029136 A1 | 3/2012 |

* cited by examiner

DRIVE-PATTERN EVALUATION DEVICE AND DRIVE-PATTERN EVALUATION METHOD

TECHNICAL FIELD

The present invention relates to a device for evaluating a speed change pattern (hereinafter referred to as drive pattern) of a moving body based on energy consumption.

BACKGROUND ART

Patent Document 1 discloses a fuel consumption measuring device which compares fuel consumption of one's own vehicle in a drive section this time and fuel consumption thereof in the past, and displays the comparison result. According to this, the user can make comparison with the past fuel consumption and judge whether the fuel consumption this time is good or bad.

Further, Patent Document 2 discloses a vehicle drive evaluation device which compares the best fuel consumption estimated based on an actual drive pattern and actual fuel consumption with respect to a past drive section, thereby evaluating the fuel consumption.

PRIOR ART DOCUMENTS

Patent Documents

Patent Document 1: Japanese Patent Application Laid-Open No. 2001-108503
Patent Document 2: Japanese Patent Application Laid-Open No. 2010-203405

SUMMARY OF INVENTION

Problems to be Solved by the Invention

Although fuel consumption of a vehicle fluctuates due to a speed change, the speed change of the vehicle depends on a signal status, a traffic status such as a traffic volume, or a road shape such as a curve or a road width. In the fuel consumption measuring device of Patent Document 1, the past fuel consumption is displayed as a comparison reference for the fuel consumption, but there has been a problem in that, even when drive fuel consumption with respect to the past drive section with a different traffic state or road shape is taken as the comparison reference, it is not possible to accurately evaluate whether the fuel consumption is good or bad.

In the vehicle drive evaluation device of Patent Document 2, since evaluation is performed by estimating the best fuel consumption based on the actual drive pattern and comparing the best fuel consumption with the actual fuel consumption, the fuel consumptions are compared with respect to the same drive section. However, since the fuel consumption of the vehicle depends most on the drive pattern, the actual drive pattern is not necessarily the best for the fuel consumption. For this reason, the best fuel consumption estimated with respect to the actual drive pattern has been insufficient as an evaluation reference for fuel saving drive.

In view of the foregoing problems, an object of the present invention is to provide a drive-pattern evaluation device for appropriately evaluating energy-saving performance of a drive pattern.

Means for Solving the Problems

A drive-pattern evaluation device of the present invention is a drive-pattern evaluation device which evaluates a past actual drive pattern of a moving body based on energy consumption, the device including: an energy-saving drive pattern generating unit that generates an energy-saving drive pattern in consideration of energy consumption with respect to an evaluation section of the actual drive pattern; an energy consumption estimating unit that estimates energy consumption by the energy-saving drive pattern as an estimated energy-saving consumption; and an energy-saving evaluating unit that compares energy consumption by the actual drive pattern in the evaluation section and the estimated energy-saving consumption, to evaluate the actual drive pattern based on the comparison result.

Effects of the Invention

The drive-pattern evaluation device of the present invention is a drive-pattern evaluation device which evaluates a past actual drive pattern of a moving body based on energy consumption, the device including: an energy-saving drive pattern generating unit that generates an energy-saving drive pattern in consideration of energy consumption with respect to an evaluation section of the actual drive pattern; an energy consumption estimating unit that estimates energy consumption by the energy-saving drive pattern as an estimated energy-saving consumption; and an energy-saving evaluating unit that compares energy consumption by the actual drive pattern in the evaluation section and the estimated energy-saving consumption, to evaluate the actual drive pattern based on the comparison result, whereby it is possible to appropriately evaluate energy-saving performance of the drive pattern.

A drive-pattern evaluation method of the present invention is a drive-pattern evaluation method which evaluates a past actual drive pattern of a moving body based on energy consumption, the method including the steps of: generating an energy-saving drive, pattern in consideration of energy consumption with respect to an evaluation section of the actual drive pattern; estimating energy consumption in the evaluation section by the energy-saving drive pattern as an estimated energy-saving consumption and estimating, by use of speed information of the actual drive pattern and map information, energy consumption in the evaluation section by the actual drive pattern as an estimated actual energy consumption; and comparing the estimated energy-saving consumption and the estimated actual energy consumption, to evaluate the actual drive pattern based on the comparison result. Therefore, it is possible to appropriately evaluate energy-saving performance of the drive pattern.

An object, characteristics, aspects and advantages of the present invention will become more apparent by the following detailed descriptions and attached drawings.

DESCRIPTION OF EMBODIMENTS

A. First Embodiment

A drive-pattern evaluation device 100 according to a first embodiment is mounted in a navigation apparatus equipped in a moving body such as a vehicle, and the drive-pattern evaluation device 100 evaluates energy-saving performance of a drive pattern of the moving body where it is equipped. Hereinafter, a vehicle will be described as the moving body.

A-1. Configuration

Figure 1:
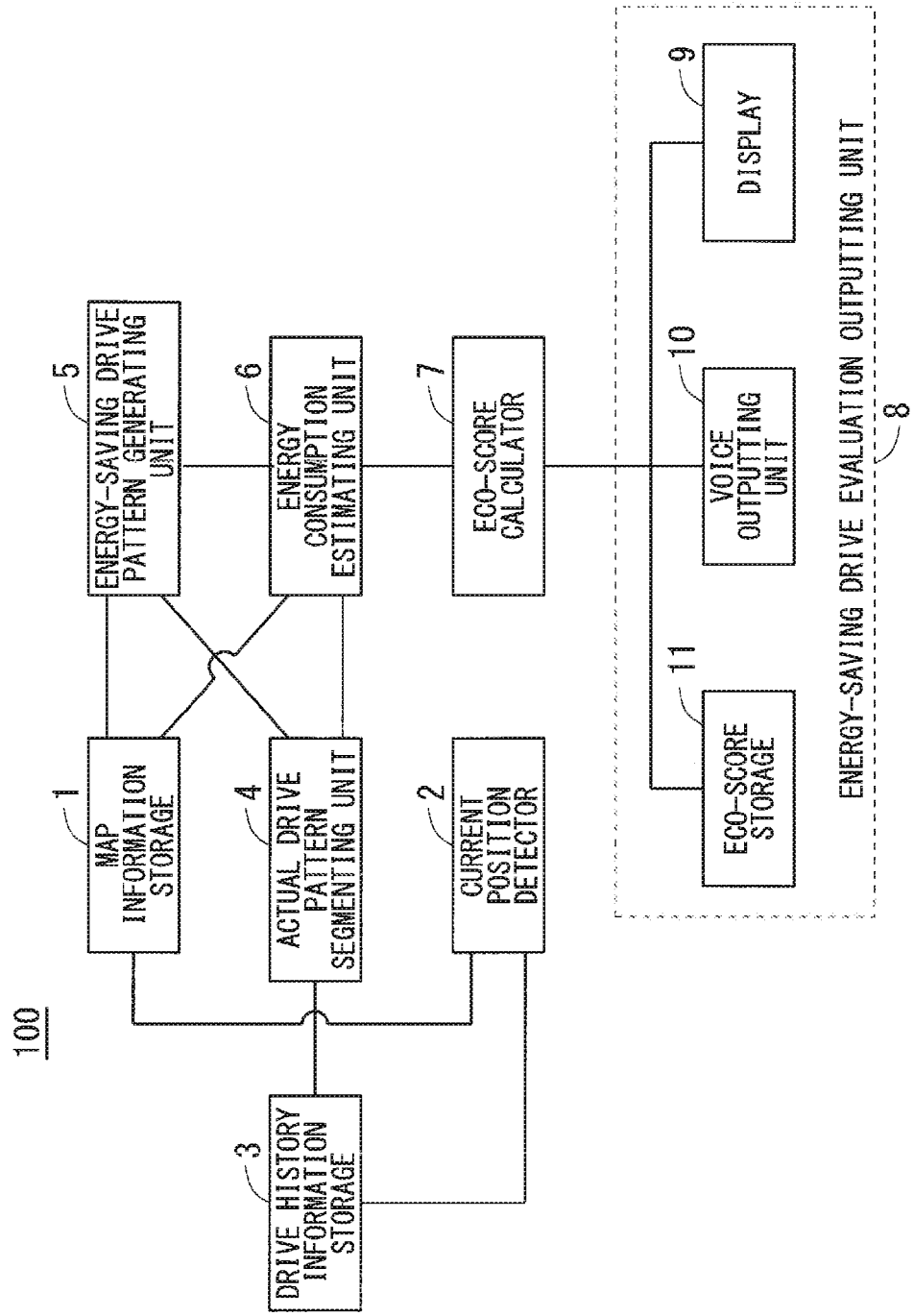
FIG. 1 is a block diagram showing a configuration of a drive-pattern evaluation device according to a first embodiment.

FIG. 1 is a block diagram showing a configuration of the drive-pattern evaluation device 100 according to the first embodiment. The drive-pattern evaluation device 100 is provided with a map information storage 1, a current position detector 2, a drive history information storage 3, an actual drive pattern segmenting unit 4, an energy-saving drive pattern generating unit 5, an energy consumption estimating unit 6, an eco-score calculator 7, and an energy-saving drive evaluation outputting unit 8.

The map information storage 1 is a database for storing map information to be used in navigation processing such as route search. It is to be noted that the map information includes road information showing nodes, a road link that connects nodes, a road type as a road attribute of the rode link, an elevation difference of the road link, or the like, for example.

The current position detector 2 is means that detects a current position of the vehicle equipped with the drive-pattern evaluation device 100, and for example, it detects the current position from a GPS signal, or detects the current position by combining the GPS signal with a signal of each of a variety of sensors such as an acceleration sensor and a gyro sensor. The detected current position information is outputted to the drive history information storage 3.

The drive history information storage 3 receives the current position detected by the current position detector 2, and stores drive history information of a route on which the vehicle drived in the past. That is, information regarding a drive time, a drive position, link information of the drive route and a drive speed, and the like are recorded and stored.

The actual drive pattern segmenting unit 4 decides a section for which an energy-saving drive pattern is generated from the past drive route, and generates a pattern of actual drive (hereinafter referred to as actual drive pattern) of the vehicle from the drive history information of the section.

Figure 2:
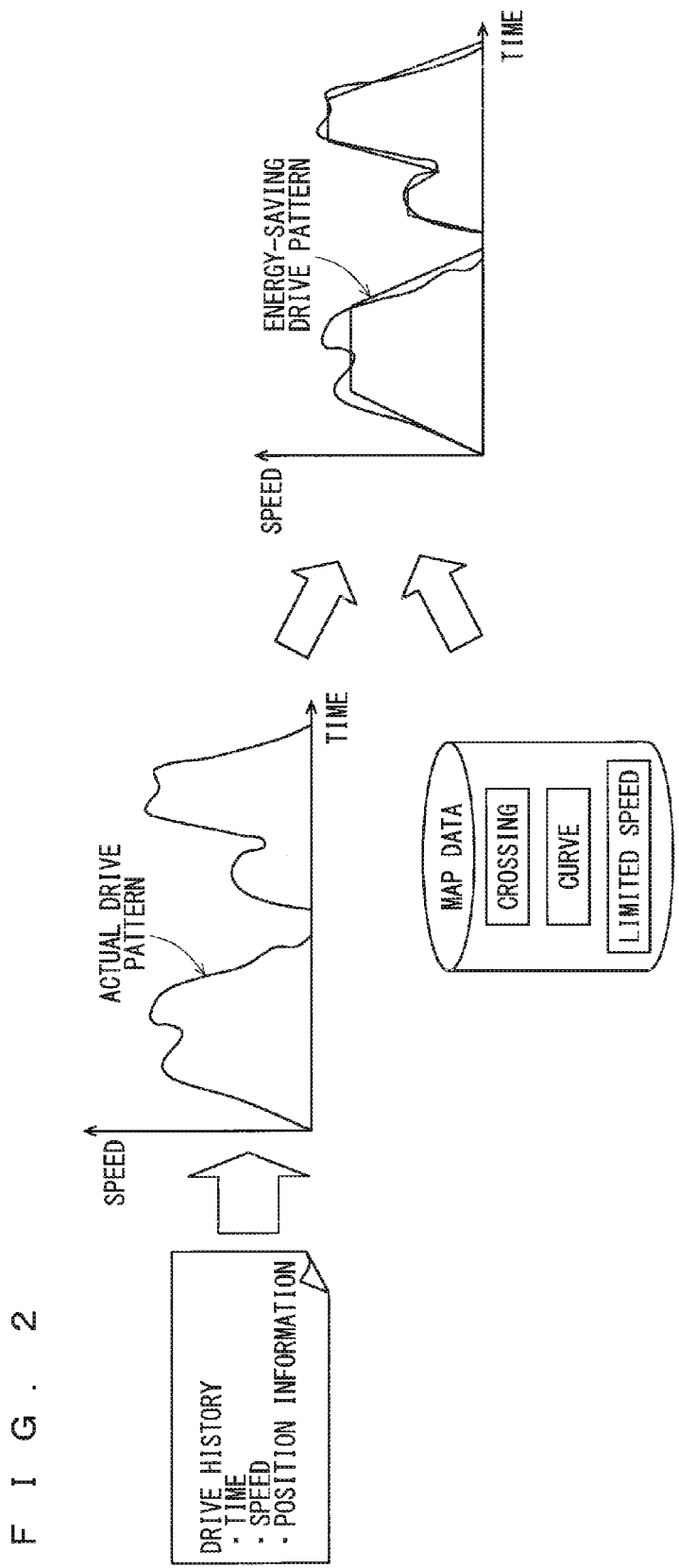
FIG. 2 is a diagram showing an operation of an energy-saving drive pattern generating unit of the drive-pattern evaluation device according to the first embodiment.

As shown in FIG. 2, the energy-saving drive pattern generating unit 5 acquires the map information from the map information storage 1 and the actual drive pattern from the actual drive pattern segmenting unit 4 and generates, based on these, a drive pattern (hereinafter referred to as energy-saving drive pattern) with lower energy consumption with respect to the same drive section as that of the actual drive pattern. The energy-saving drive pattern is made up of an acceleration section, a cruising section and a deceleration section, and as shown in FIG. 2, a speed-time graph is represented in a trapezoidal shape. When information of a point at which the speed can decrease such as a crossing or a curve and information such as a limit speed for the road are taken into consideration with reference to the map information, it is possible to generate an energy-saving drive pattern in which actual drive is possible. As one example thereof, a method disclosed in WO2011/036855 can be used, for example.

The energy consumption estimating unit 6 acquires the actual drive pattern from the actual drive pattern segmenting unit 4, and estimates energy consumption in the actual drive pattern as an estimated actual energy consumption $Q_r$ by use of a calculation model described later. Further, the energy consumption estimating unit 6 acquires the energy-saving drive pattern from the energy-saving drive pattern generating unit 5, and estimates energy consumption in the energy-saving drive pattern as an estimated energy-saving consumption $Q_e$ by use of the same model as the calculation model of the estimated actual energy consumption.

The eco-score calculator 7 compares the estimated actual energy consumption $Q_r$ and the estimated energy-saving consumption $Q_e$, thereby calculating energy-saving performance of the actual drive pattern as an eco-score.

The energy-saving drive evaluation outputting unit 8 is output means that outputs the eco-score calculated by the eco-score calculator 7, and is provided with a display 9 such as a display device, a voice outputting unit 10 such as a speaker, and an eco-score storage 11 such as a storage device. By outputting the eco-score by these output means, evaluation of the energy-saving performance of the actual drive pattern is notified to the user.

A-2. Operation

The eco-score calculation processing of the drive-pattern evaluation device 100 according to the first embodiment will be described along a flowchart of FIG. 3.

First, the actual drive pattern segmenting unit 4 decides an eco-score calculation target section at predetermined timing (Step S1). In the case of repeatedly performing eco-score calculation processing at every predetermined interval, such as every one minute, a section from a previous calculation target section to a current drive point is taken as a calculation target section this time. Alternatively, in the case of starting the eco-score calculation processing at the time when the vehicle stops, a drive section from a previous stop point to a stop point this time is taken as the calculation target section.

Next, the actual drive pattern segmenting unit 4 determines whether or not the calculation target section is effective (Step S2). When the calculation target section is short or when elapsed time from leaving the previous calculation target section is short, the actual drive pattern segmenting unit 4 cannot accurately calculate a score, and thus judges the calculation target section as non-effective. When judging the calculation target section as effective, the actual drive pattern segmenting unit 4 acquires a drive history for the calculation target section as an actual drive pattern (Step S3).

Next, the energy-saving drive pattern generating unit 5 acquires the drive history (actual drive pattern) from the actual drive pattern segmenting unit 4 and calculates, based on this, an energy-saving drive pattern by predetermined algorithm (Step S4). For example, there can be considered a method of taking as a constraint condition a drive speed at a predetermined position in the drive history in the calculation target section, and calculating such a drive pattern where a total acceleration amount in the calculation target section becomes small.

Next, the energy consumption estimating unit 6 acquires the actual drive pattern from the actual drive pattern segmenting unit 4, and calculates an estimated energy consumption (estimated actual energy consumption) $Q_r$ in the actual drive pattern (Step S5). Further, the energy consumption estimating unit 6 acquires the energy-saving drive pattern from the energy-saving drive pattern generating unit 5, and calculates an estimated energy consumption (estimated energy-saving consumption) $Q_e$ in the energy-saving drive pattern (Step S6).

Here, the estimated actual energy consumption $Q_r$ and the estimated energy-saving consumption $Q_e$ are calculated by means of the same estimation model. Expression (1) shows the estimation model.

[Numerical Expression 1]

$$Q = C_1 E_1 + C_2 E_2 + C_3 E_3 - C_4 E_4 + C_5 E_5 + C_6 E_6 - C_7 E_7 \quad (1)$$

where $C_1, C_2, \ldots, C_7$ are weighting coefficients of the respective terms. It should be noted that in Expression (1), $E_1$ is a parameter depending on drive time, and expressed by Expression (2).

[Numerical Expression 2]

$$E_1 = q_{base} T \quad (2)$$

where T (s) is drive time for a drive route, and $q_{base}$ (cc/s) is basic energy consumption per unit time. $E_2$ is a parameter depending on a drive distance, and expressed by Expression (3).

[Numerical Expression 3]

$$E_2 = \frac{1}{\varepsilon \eta H} \mu M g D \quad (3)$$

where $\varepsilon$ represents net thermal efficiency, $\eta$ represents gross transmission efficiency, and $\varepsilon \cdot \eta$ represents efficiency in converting calories in fuel to vehicle propulsion. Further, H is a calorie conversion coefficient of the fuel. $\mu$ is a friction coefficient between a tire of one's own car and a road surface, M represents a vehicle weight of one's own car including a passenger and a load, g represents gravitational acceleration, and D represents a length of a road section. Next, $E_3$ is a parameter depending on an ascending elevation difference, and expressed by Expression (4).

[Numerical Expression 4]

$$E_3 = \frac{1}{\varepsilon \eta H} M g \sum_{k=0}^{n_{up}} H_{upk} \quad (4)$$

where $n_{up}$ is the number of ascending road sections in the drive route, and $H_{upk}$ represents an elevation difference of a k-th ascending road section in the drive route. Next, $E_4$ is a parameter depending on a descending elevation difference, and expressed by Expression (5).

[Numerical Expression 5]

$$E_4 = \frac{1}{\varepsilon \eta H} M g \sum_{k=0}^{n_{down}} H_{downk} \quad (5)$$

where $n_{down}$ is the number of descending road sections in the drive route, and $H_{downk}$ represents an elevation difference of a k-th descending road section in the drive route. $E_5$ is a parameter depending on air resistance, and expressed by Expression (6).

[Numerical Expression 6]

$$E_5 = \frac{1}{\varepsilon \eta H} \frac{1}{2} C S \sum_{t=0}^{T} \rho v_t^3 \quad (6)$$

where C is an air resistance coefficient, S is a front-surface projected area of the vehicle, $\rho$ is an air density, and $v_t$ is a speed of the vehicle at a time t. $E_6$ is a parameter depending on acceleration, and expressed by Expression (7).

[Numerical Expression 7]

$$E_6 = \frac{1}{\varepsilon \eta H} \frac{1}{2} (M + m) \sum_{k=0}^{n_{acc}} (v_{acc\_e\_k}^2 - v_{acc\_s\_k}^2) \quad (7)$$

where m is an inertial mass, and $n_{acc}$ represents the number of acceleration sections in the drive route. Further, $v_{acc\_e\_k}$ and $v_{acc\_s\_k}$ respectively represent a terminal speed and a starting speed of a k-th acceleration section. $E_7$ is a parameter depending on deceleration, and expressed by Expression (8).

[Numerical Expression 8]

$$E_7 = \frac{1}{\varepsilon \eta H} \frac{1}{2} (M + m) \sum_{k=1}^{n_{dec}} (v_{dec\_e\_k}^2 - v_{dec\_s\_k}^2) \quad (8)$$

where $n_{dec}$ represents the number of deceleration sections in the drive route. Further, $v_{acc\_e\_k}$ and $v_{acc\_s\_k}$ respectively represent a terminal speed and a starting speed of a k-th deceleration section.

In Expression (1), when $C_2 E_2 + C_3 E_3 - C_4 E_4 + C_5 E_5 + C_6 E_6 - C_7 E_7$ except for the first term becomes a negative value, values to be subtracted in the fourth term ($C_4 E_4$) and the seventh term ($C_7 E_7$) are made small so as to realize Q=0. Methods to make them small include a method of preferentially making any of the terms small, a method of uniformly making each of them small, and some other method.

The estimated actual energy consumption $Q_r$ and the estimated energy-saving consumption $Q_e$ are calculated by means of the estimation model described above. It is to be noted that, although Expression (1) is a model targeted at a gasoline car, it can also be applied to an electric car by changing the coefficient of each parameter. Further, although the fuel consumption is regarded as the energy consumption in Expression (1), when it is applied to the electric car, electric power consumption is taken as the energy consumption.

Figure 3:
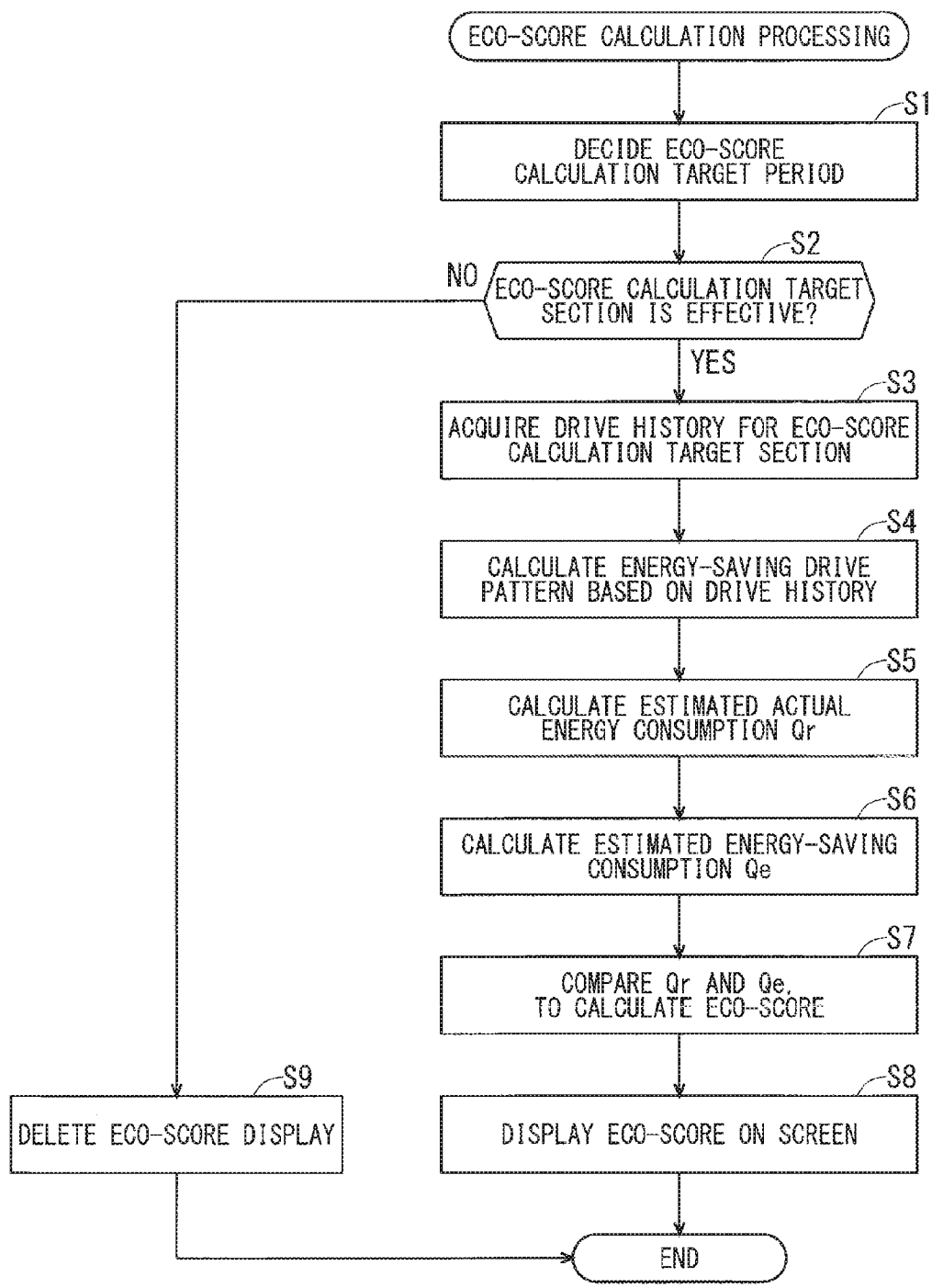
FIG. 3 is a flowchart showing eco-score calculation processing of the drive-pattern evaluation device according to the first embodiment.

Returning to the flowchart of FIG. 3, the eco-score calculator 7 compares $Q_r$ and $Q_e$, to calculate an eco-score (Step S7). As the value $Q_r$ is closer to $Q_e$, the energy-saving performance of the actual drive pattern are considered to be higher. In the case of representing the eco-score by means of five-grade evaluation where 1 is bad and 5 is good, as a value of $Q_e/Q_r$ is larger, an eco-score is set to be higher. For example, the eco-score is set to 5 when $Q_e/Q_r \geq 98(\%)$. Alternatively, the eco-score may be decided from a difference between $Q_r$ and $Q_e$. For example, the eco-score is set to 5 when $(Q_r-Q_e) \leq 10$ (cc). Since $(Q_r-Q_e)$ also fluctuates depending on a length of the calculation target section, $(Q_r-Q_e)$ may be divided by a drive distance D, and the eco-score may be decided from a difference in energy consumption per unit distance.

The eco-score calculated in the eco-score calculator 7 is transmitted to the energy-saving drive evaluation outputting unit 8 and is displayed on the display 9 (Step S8). It is to be noted that the eco-score may be voice-outputted from the voice outputting unit 10. Further, when the eco-score is previously stored as a history into the eco-score storage 11, it is possible to display the eco-score at predetermined timing after calculation thereof, and to display the history of the eco-score on the display 9 at all times.

When the eco-score calculation target section is non-effective in Step S2, the previous eco-score display is deleted (Step S9).

A-3. Modified Example

It has been described in the above description that the energy consumption in the actual drive pattern and the energy consumption in the energy-saving drive pattern are calculated by means of the same estimation model, but as the energy consumption in the actual drive pattern, an actual value acquired from a fuel consumption meter or the like can also be used.

A-4. Effect

The drive-pattern evaluation device 100 according to the first embodiment is a drive-pattern evaluation device which evaluates a past actual drive pattern of a moving body based on energy consumption, the device including: the energy-saving drive pattern generating unit 5 that generates an energy-saving drive pattern in consideration of energy consumption with respect to an evaluation section of the actual drive pattern; the energy consumption estimating unit 6 that estimates energy consumption by the energy-saving drive pattern as an estimated energy-saving consumption; and the eco-score calculator 7 (energy-saving evaluating unit) that compares energy consumption by the actual drive pattern in the evaluation section and the estimated energy-saving consumption, to evaluate the actual drive pattern based on the comparison result. By generating the energy-saving drive pattern with respect to the evaluation section of the actual drive pattern, it becomes possible to make drive conditions, such as a road state and a traffic state, uniform in the actual drive pattern and the energy-saving drive pattern. Hence it becomes possible to appropriately evaluate energy-saving performance of the drive pattern.

Further, since the energy-saving drive pattern generating unit 5 generates the energy-saving drive pattern from the drive history, by generating the energy-saving drive pattern so as not to disturb the drive conditions such as the road state and the traffic state in the actual drive pattern, it becomes possible to extract a change in energy consumption due to a difference in drive pattern, and appropriately evaluate the energy-saving performance.

Moreover, the energy consumption estimating unit 6 estimates the energy consumption in the evaluation section of the actual drive pattern as an estimated actual energy consumption by use of the same model as the estimation model of the estimated energy-saving consumption, and the eco-score calculator 7 (energy-saving evaluating unit) compares the estimated actual energy consumption and the estimated energy-saving consumption, to evaluate the actual drive pattern based on the comparison result. By applying the same model to the actual drive pattern and the energy-saving drive pattern to estimate the energy consumption, it becomes possible to focus on the difference in energy consumption due to the difference in drive pattern, and appropriately evaluate the energy-saving performance.

Alternatively, the eco-score calculator 7 (energy-saving evaluating unit) may compare the actual energy consumption in the evaluation section of the actual drive pattern and the estimated energy-saving consumption, to evaluate the actual drive pattern based on the comparison result, and in this case, by bringing each parameter in the estimation model of the estimated energy-saving consumption closer to an actual value in an exact manner, it becomes possible to extract only a difference in energy consumption due to the difference in drive pattern, and evaluate the energy-saving performance.

B. Second Embodiment

B-1. Configuration

Figure 4:
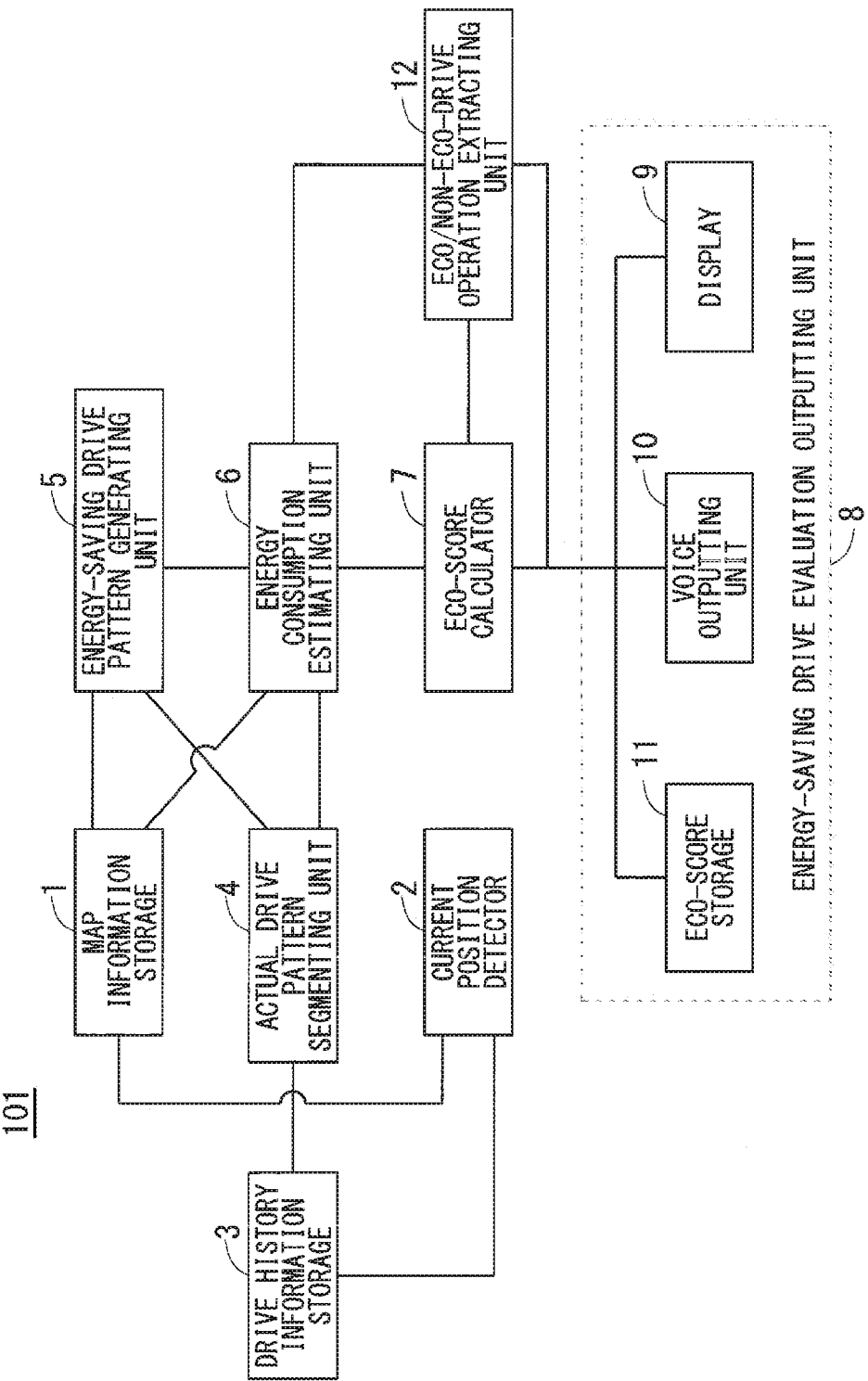
FIG. 4 is a block diagram showing a configuration of a drive-pattern evaluation device according to a second embodiment.

FIG. 4 is a constitutional diagram of a drive-pattern evaluation device 101 according to a second embodiment. The drive-pattern evaluation device 101 further includes an eco/non-eco-drive operation extracting unit 12 in addition to the configuration of the drive-pattern evaluation device 100 according to the first embodiment.

The eco/non-eco-drive operation extracting unit 12 extracts an eco-drive operation which improves an energy consumption rate and a non-eco-drive operation which worsens an energy consumption rate from a trend of a specific parameter in the energy consumption model (Expression (1)), used by the energy consumption estimating unit 6, and an eco-score. Information of the drive operation extracted by the eco/non-eco-drive operation extracting unit 12 is outputted from the display 9 and the voice outputting unit 10. Accordingly, it is possible to give a driver an advice of a drive operation suitable for energy-saving drive.

The configuration other than the eco/non-eco-drive operation extracting unit 12 is similar to that of the drive-pattern evaluation device 100 according to the first embodiment, and hence a description thereof is omitted.

B-2. Operation

The eco/non-eco-drive operation extracting unit 12 extracts an eco-drive operation and a non-eco-drive operation from a trend of each of the parameters $E_1, E_2, \ldots, E_7$ in the energy consumption calculation model (Expression (1)) and an eco-score. As the eco-drive operation well known are: gentle acceleration, constant speed drive (drive with a little acceleration/deceleration), early-off acceleration, drive in consideration of slope (acceleration using a descending slope), and the like.

The eco/non-eco-drive operation extracting unit 12 detects that the eco-drive operation, "early-off acceleration", has been performed in a case where an eco-score in a predetermined time range before the stop is good, and a difference is small between the parameter $E_7$ depending on deceleration in the estimation expression (Expression (1)) of the estimated actual energy consumption $Q_r$ and the parameter $E_7$ depending on deceleration in the estimation expression (Expression (1)) of the estimated energy-saving consumption $Q_e$. Further, it is detected that the eco-drive operation, "constant speed drive", has been performed in a case where an eco-score in the predetermined time range is good, and a difference is small between the parameter $E_6$ depending on acceleration in the estimation expression (Expression (1)) of the estimated actual energy consumption $Q_r$ and the parameter $E_6$ depending on acceleration in the estimation expression (Expression (1)) of the estimated energy-saving consumption $Q_e$. Moreover, it is detected that the eco-drive operation, "drive in consideration of slope", has been performed in a case where an eco-score in the predetermined time range is good, and a difference is small between the parameter $E_4$ depending on a descending elevation difference in the estimation expression (Expression (1)) of the estimated actual energy consumption $Q_r$ and the parameter $E_4$ depending on a descending elevation difference in the estimation expression (Expression (1)) of the estimated energy-saving consumption $Q_e$. Furthermore, it is detected that the non-eco-drive operation called "wavy drive (operation with much acceleration/deceleration) has been performed in a case where an eco-score in the predetermined time range is bad, and a difference is large between the parameter $E_6$ depending on acceleration in the estimation expression (Expression (1)) of the estimated actual energy consumption $Q_r$ and the parameter $E_6$ depending on acceleration in the estimation expression (Expression (1)) of the estimated energy-saving consumption $Q_e$.

It should be noted that, although the drive operation has been extracted based on the difference in parameter in the above, it may be based on a ratio of the parameters or may be based on a difference in parameter per unit distance in a similar manner to calculation of an eco-score.

B-3. Effect

In the drive-pattern evaluation device 101 according to the second embodiment, the estimation model of the estimated energy-saving consumption is a model including at least one of parameters $E_1, E_2, \ldots, E_7$ respectively depending on drive time, a drive distance, an elevation difference of a drive route, air resistance and acceleration/deceleration for the moving body, and there is further provided the eco/non-eco-drive operation extracting unit 12 that extracts a drive operation which improves or worsens an energy consumption rate from a trend of the parameters in the estimated energy-saving consumption $Q_e$ and the estimated actual energy consumption $Q_r$, whereby it becomes possible to extract the drive operation having caused improvement or worsening of the energy consumption rate. Further, when the extraction result is notified to the user, an operational advice regarding the eco-drive operation can be given.

C. Third Embodiment

A drive-pattern evaluation device 102 according to a third embodiment has a function of notifying the user in the case of detecting a sudden-stop operation which worsens an energy consumption rate, in addition to the function of the drive-pattern evaluation device 100 according to the first embodiment.

C-1. Configuration

Figure 5:
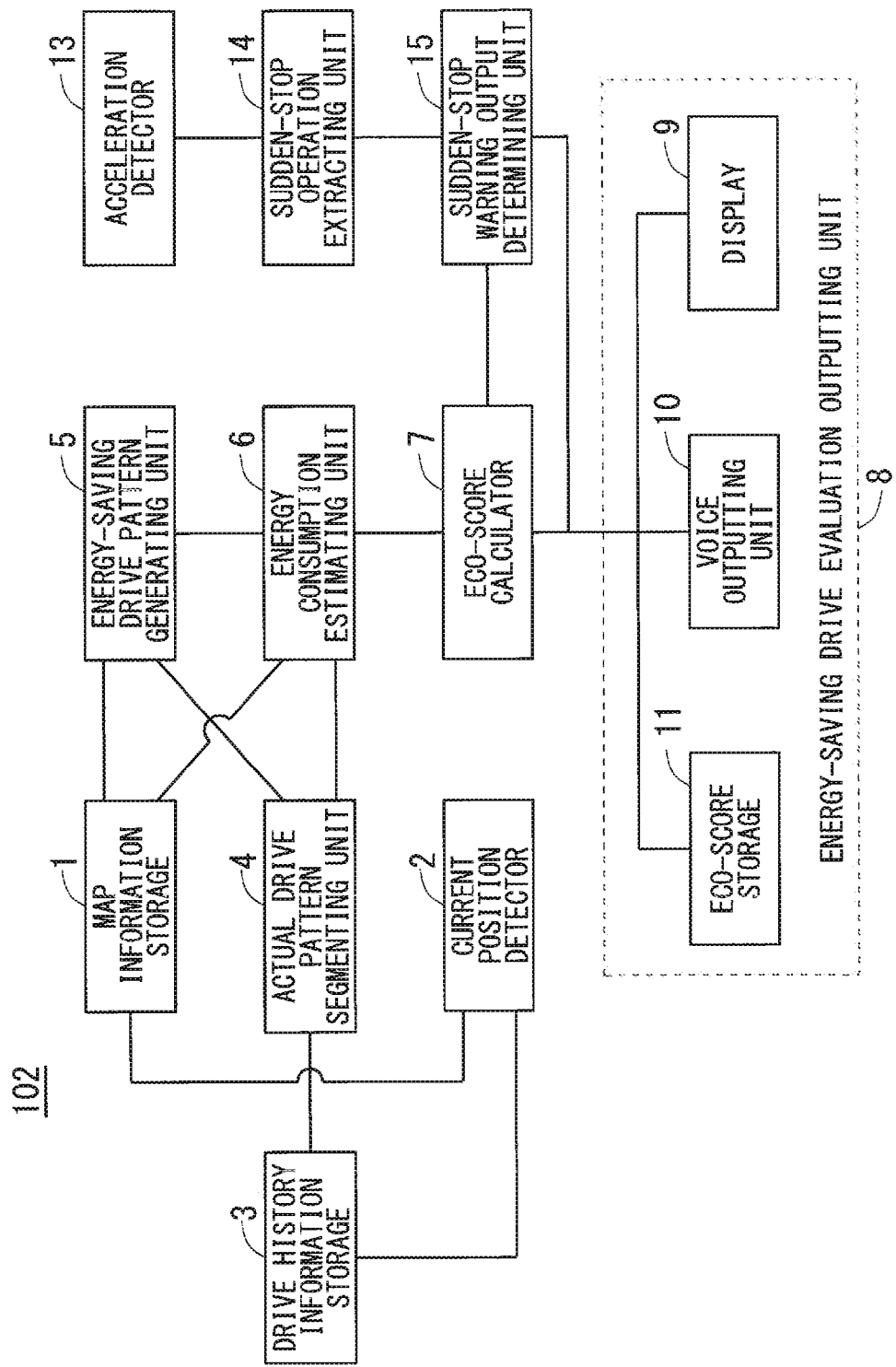
FIG. 5 is a block diagram showing a configuration of a drive-pattern evaluation device according to a third embodiment.

FIG. 5 is a block diagram showing a configuration of the drive-pattern evaluation device 102 according to the third embodiment. In addition to the configuration of the drive-pattern evaluation device 100 according to the first embodiment, the drive-pattern evaluation device 102 further includes an acceleration detector 13, a sudden-stop operation extracting unit 14 and a sudden-stop warning output determining unit 15.

The acceleration detector 13 is means that detects acceleration/deceleration of a vehicle equipped with the drive-pattern evaluation device 102, and outputs the detection result to the sudden-stop operation extracting unit 14.

The sudden-stop operation extracting unit 14 detects a sudden-stop operation having been performed when the vehicle stops or the speed thereof becomes a fixed value or lower and a value of deceleration of the vehicle detected by the acceleration detector 13 in a deceleration section exceeds a predetermined threshold. Here, the sudden-stop operation includes a case where the vehicle starts to decelerate before a signal but it does not completely stop and then accelerates since the signal is turned green. Further, the deceleration section indicates a section from a point when the vehicle starts to decelerate to a point when it stops or the speed thereof becomes the fixed value or lower. The extraction result of the sudden-stop operation extracting unit 14 is outputted to the sudden-stop warning output determining unit 15.

After acquiring an eco-score in the deceleration section of the sudden-stop operation or for fixed time (e.g., 30 seconds) before the stop or before the vehicle speed becomes the fixed value or lower, the sudden-stop warning output determining unit 15 gives an advice to warn of the sudden-stop operation by use of the energy-saving drive evaluation outputting unit 8 only when the eco-score is bad.

The constitutional elements other than the acceleration detector 13, the sudden-stop operation extracting unit 14 and the sudden-stop warning output determining unit 15 are similar to those of the drive-pattern evaluation device 100 according to the first embodiment, and hence a description thereof will be omitted.

C-2. Operation

Figure 6:
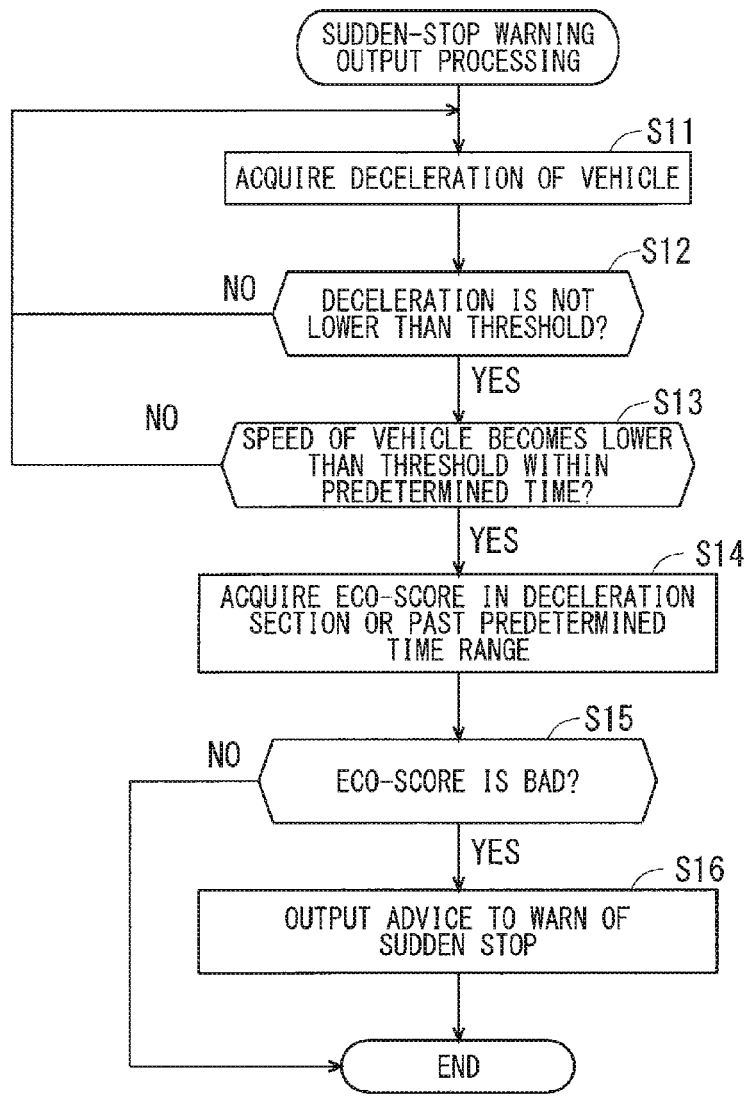
FIG. 6 is a flowchart showing sudden-stop warning output processing of the drive-pattern evaluation device according to the third embodiment.

FIG. 6 is a flowchart showing sudden-stop warning output processing of the drive-pattern evaluation device 102. The sudden-stop operation extracting unit 14 acquires deceleration of the vehicle from the acceleration detector 13 in a fixed cycle (Step S11). The sudden-stop operation extracting unit 14 judges whether the deceleration is not lower than a threshold (Step S12). When the deceleration is lower than the threshold, it is judged that a sudden-brake operation has not been performed, and the processing is returned to Step S11, to acquire deceleration of the vehicle at the next timing.

In Step S12, when the deceleration is not lower than the threshold, it is judged that the sudden-brake operation has been performed, and in Step S13, it is judged whether or not the vehicle speed becomes lower than the threshold within predetermined time. When the vehicle speed is not lower than the threshold, it is judged that the sudden-stop operation has not been performed, and the processing is returned to Step S11, to acquire deceleration of the vehicle at the next timing.

In Step S13, when the vehicle speed is lower than the threshold (YES in Step S13), it is judged that the sudden-stop operation has been performed, and the sudden-stop warning output determining unit 15 acquires from the eco-score calculator 7 an eco-score in the deceleration section or an eco-score in a past predetermined time range back from the point of time when the vehicle speed became the lowest (Step S14). It is to be noted that the eco-score calculator 7 performs the operation shown in the flowchart of FIG. 3 as required, to calculate the eco-score in the section concerned.

The sudden-stop warning output determining unit 15 judges whether or not the eco-score acquired from the eco-score calculator 7 is bad (Step S15). For example, in the case of the eco-score being represented by the five-grade evaluation where 1 is bad and 5 is good, when the eco-score is smaller than the threshold, it is judged that the eco-score is bad, namely the energy-saving drive is not being performed. Then, an advice to warn of the sudden stop is outputted from the energy-saving drive evaluation outputting unit 8 (Step S16). When the eco-score is not smaller than the threshold, namely the energy-saving drive is being performed, the advice to warn of the sudden stop is not outputted, and the processing is completed.

By the above operation, in the case of detection of the sudden-stop operation, only when it is judged from an eco-score in a predetermined section including a point of the sudden-stop operation that the energy-saving drive is not being performed, the advice to warn of the sudden stop is given.

Figure 7:
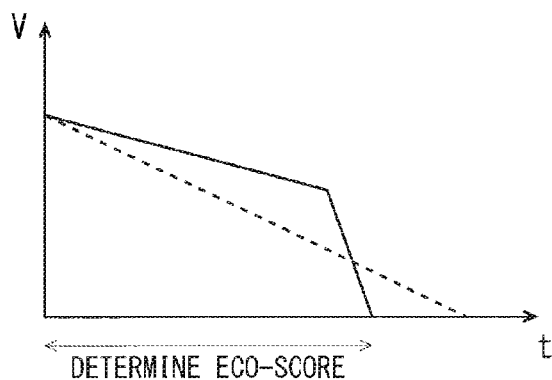
FIG. 7 is a diagram showing an operation of the drive-pattern evaluation device according to the third embodiment.

FIG. 7 shows a drive pattern (dotted line) in which the speed decreases with constant acceleration until a signal is reached, and a drive pattern (solid line) in which the speed gradually decreases by use of an engine brake, followed by a sudden stop near the signal. In the case of detection of the sudden-stop operation, only when an eco-score throughout the deceleration section is bad, the sudden-stop warning advice is given.

C-3. Effect

The drive-pattern evaluation device 102 according to the third embodiment includes: the energy-saving drive evaluation outputting unit 8 (evaluation outputting unit) that outputs drive evaluation to the driver; the acceleration detector 13 (deceleration detector) that detects deceleration of the moving body; the sudden-stop operation extracting unit 14 that detects a sudden-stop operation based on the deceleration; and the sudden-stop warning output determining unit 15 (output determining unit) that determines whether or not to output the detection result as the drive evaluation from the energy-saving drive evaluation outputting unit 8 in accordance with the evaluation result of the eco-score calculator 7 (energy-saving evaluating unit) in the case where the sudden-stop operation extracting unit 14 detects the sudden-stop operation, whereby it is possible to notify the user only of the sudden-stop operation which worsens an energy consumption rate out of the sudden-stop operations.

It should be noted that, although the example has been shown in each of the above embodiments where the drive-pattern evaluation device is mounted in the navigation apparatus equipped in the vehicle, this is not restrictive. For example, the drive-pattern evaluation device may be mounted in the moving body itself, such as a vehicle. Further, the drive-pattern evaluation device may be mounted in a mobile terminal such as a smart phone or a tablet terminal. Moreover, the drive-pattern evaluation device may be mounted in a server provided outside the moving body. In this case, it can be configured such that a result generated by the drive-pattern evaluation device is acquired by a communication function in the moving body, the navigation apparatus mounted in the moving body or the mobile terminal. In view of the foregoing, the elements of the drive-pattern evaluation device, e.g., as illustrated in FIG. 1, may be implemented using a processor and a memory.

Furthermore, from the moving body or the navigation apparatus mounted in the moving body, drive history information may, for example, be recorded in a record medium and outputted to the outside, and a drive pattern may be evaluated in the drive-pattern evaluation device mounted in external equipment. Additionally, from the moving body or the navigation apparatus mounted in the moving body, drive history information may, for example, be outputted by a communication function in the smart phone, for example, and a drive pattern may be evaluated in the drive-pattern evaluation device mounted in the external equipment.

It is to be noted that in the present invention, it is possible within a scope of the present invention to freely combine each of the embodiments, modify an arbitrary constitutional element of each of the embodiments, or omit an arbitrary constitutional element in each of the embodiments.

Although the present invention has been described in detail, the above descriptions are illustrative in every aspect and do not restrict the present invention. It is understood that countless numbers of modified examples, not shown, can be conceived without deviating from the scope of the present invention.

EXPLANATION OF REFERENCE NUMERALS

1 map information storage; 2 current position detector; 3 drive history information storage; 4 actual drive pattern segmenting unit; 5 energy-saving drive pattern generating unit; 6 energy consumption estimating unit; 7 eco-score calculator; 8 energy-saving drive evaluation outputting unit; 9 display; 10 voice outputting unit; 11 eco-score storage; 12 eco/non-eco-drive operation extracting unit; 13 acceleration detector; 14 sudden-stop operation extracting unit; 15 sudden-stop warning output determining unit; 100, 101, 102 drive-pattern evaluation device

The invention claimed is:

1. A drive-pattern evaluation device which evaluates a past actual drive pattern of a moving body based on energy consumption, the device comprising:
   a processor coupled with a memory in which instructions are stored which are executed by the processor configured to:
      generate an energy-saving drive pattern in consideration of energy consumption with respect to an evaluation section of said past actual drive pattern by:
         extracting an actual speed at which the moving body was moving on said evaluation section of said actual drive pattern, and applying said extracted speed as a condition to be met by said energy-saving drive pattern, and
         calculating said energy-saving drive pattern as a function of speed versus time which reduces a total acceleration amount relative to said actual drive pattern;
      estimate energy consumption in said evaluation section by said energy-saving drive pattern as an estimated energy-saving consumption by:
         extracting speed information from said energy-saving drive pattern,
         extracting information of an elevation difference of a road link in said evaluation section from map information, and
         feeding respective parameters of said speed information from said energy-saving drive pattern and said information of said elevation difference from said map information into an equation that calculates energy consumed by said moving body during said evaluation function as a function of said parameters;

estimate, by use of speed information of said actual drive pattern and map information, energy consumption in said evaluation section by said actual drive pattern as an estimated actual energy consumption by:

extracting speed information from said actual drive pattern, and feeding respective parameters of said speed information of said actual drive pattern and said information of said elevation difference from said map information into said equation; and compare said estimated energy-saving consumption and said estimated actual energy consumption, to evaluate said actual drive pattern based on the comparison result; and a display or speaker configured to output information on the evaluation of said actual drive pattern.

2. The drive-pattern evaluation device according to claim 1, wherein said energy-saving drive pattern is generated from a drive history and the map information.

3. The drive-pattern evaluation device according to claim 1, wherein said equation represents an estimation model of said estimated energy-saving consumption and said estimated actual energy consumption is a model including at least one of parameters respectively depending on drive time, a drive distance, an elevation difference of a drive route, air resistance and acceleration/deceleration for said moving body.

4. The drive-pattern evaluation device according to claim 3, wherein said processor is further configured to extract a drive operation having caused improvement or worsening of an energy consumption rate from a trend of said parameter in said estimated energy-saving consumption and said estimated actual energy consumption.

5. The drive-pattern evaluation device according to claim 4, wherein said display or speaker is further configured to output information of the drive operation.

6. The drive-pattern evaluation device according to claim 1, said process further comprising comparing said estimated energy-saving consumption and said estimated actual energy consumption, and calculating energy-saving performance of said actual drive pattern as an eco-score based on said comparison.

7. The drive-pattern evaluation device according to claim 6, wherein said eco score is calculated from a difference in energy consumption per unit distance between said estimated actual energy consumption and said estimated energy-saving consumption.

8. The drive-pattern evaluation device according to claim 6, wherein each evaluation section is a drive section in which said moving body drove in a predetermined time interval or a drive section in which said moving body drove from a previous stop point to a stop point this time.

9. The drive-pattern evaluation device according to claim 6, wherein said display or speaker is further configured to output the eco-score.

10. The drive-pattern evaluation device according to claim 1, wherein said processor is further configured to:

output a drive evaluation to a driver;
detect deceleration of said moving body;
detect a sudden-stop operation based on said deceleration; and determine whether or not to output the detection result as said drive evaluation with the evaluation result in a case where said sudden-stop operation is detected.

11. A drive-pattern evaluation method which evaluates a past actual drive pattern of a moving body based on energy consumption, the method comprising:

generating an energy-saving drive pattern in consideration of energy consumption with respect to an evaluation section of said past actual drive pattern by;

extracting an actual speed at which the moving body was moving on said evaluation section of said actual drive pattern, and applying said extracted seed as a condition to be met by said energy-saving drive pattern, and calculating said energy-saving drive pattern as a function of speed versus time which reduces a total acceleration amount relative to said actual drive pattern;

estimating energy consumption in said evaluation section by said energy-saving drive pattern as an estimated energy-saving consumption by:

extracting speed information from said energy-saving drive pattern, extracting information of an elevation difference of a road link in said evaluation section from map information, and feeding respective parameters of said speed information from said energy-saving drive pattern and said information of said elevation difference from said map information into an equation that calculates energy consumed by said moving body during said evaluation function as a function of said parameters;

estimating, by use of speed information of said actual drive pattern and map information, energy consumption in said evaluation section by said actual drive pattern as an estimated actual energy consumption by;

extracting speed information from said actual drive pattern, and feeding respective parameters of said speed information of said actual drive pattern and said information of said elevation difference from said map information into said equation; and comparing said estimated energy-saving consumption and said estimated actual energy consumption, to evaluate said actual drive pattern based on the comparison result; and displaying or voice-outputting information on the evaluation of said actual drive pattern.

12. The drive-pattern evaluation method according to claim 11, wherein generating said energy-saving drive pattern is generating said energy-saving drive pattern from a drive history and the map information.

13. The drive-pattern evaluation method according to claim 11, wherein said equation represents an estimation model of said estimated energy-saving consumption and said estimated actual energy consumption including at least one of parameters respectively depending on drive time, a drive distance, an elevation difference of a drive route, air resistance and acceleration/deceleration for said moving body.

14. The drive-pattern evaluation method according to claim 13, wherein a drive operation having caused improvement or worsening of an energy consumption rate is extracted from a trend of said parameter in said estimated energy-saving consumption and said estimated actual energy consumption.

15. The drive-pattern evaluation method according to claim 14, wherein information of the extracted drive operation is displayed or voice-outputted.

16. The drive-pattern evaluation method according to claim 11, wherein, by comparing said estimated energy-saving consumption and said estimated actual energy consumption, energy-saving performance of said actual drive pattern is calculated as an eco-score.

17. The drive-pattern evaluation method according to claim 16, wherein said eco score is calculated from a difference in energy consumption per unit distance between said estimated actual energy consumption and said estimated energy-saving consumption.

18. The drive-pattern evaluation method according to claim 16, wherein each evaluation section is a drive section in which said moving body drove in a predetermined time interval or a drive section in which said moving body drove from a previous stop point to a stop point this time.

19. The drive-pattern evaluation method according to claim 16, wherein the calculated eco-score is displayed or voice-outputted.

20. The drive-pattern evaluation method according to claim 11, wherein:
a drive evaluation is outputted to a driver;
deceleration of said moving body is detected;
a sudden-stop operation is detected based on said deceleration; and
whether or not to output the detection result as said drive evaluation is determined in accordance with the evaluation result of said actual drive pattern in a case where said sudden-stop operation is detected.

* * * * *